UNITED STATES PATENT OFFICE 2,492,335

STABILIZATION OF ORGANIC COMPOUNDS

Joseph A. Chenicek and Ralph B. Thompson, Riverside, Ill., assignors to Universal Oil Products Company, Chicago, Ill., a corporation of Delaware No Drawing. Application April 12, 1947,
Serial No. 740,996

12 Claims. (Cl. 99—163)

This invention relates to the stabilization of organic compounds which tend to deteriorate in storage or in use due to oxidation reactions.

Various organic compounds including motor fuel, particularly cracked gasoline, polymer gasoline, Diesel oil, etc., mineral oil, lubricating oil, fuel oil, drying oil, greases, rubber, edible fats and oils, etc., are adversely affected by oxygen, with the resultant formation of undesirable gum, discoloration, rancidity or other deleterious reactions.

The invention is particularly applicable to the stabilization of edible fats and oils which generally are of animal or vegetable origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats as sold under various trade means including "Spry," "Crisco," "Snowdrift," etc. It is understood that other oils and fats may be treated within the scope of the present invention, including oils and fats which have previously been subjected to various treatments, such as blowing with air, heat treatment, etc.

In one embodiment the present invention relates to a method of stabilizing an organic material subject to oxidative deterioration which comprises adding thereto an inhibitor comprising the condensation product of a mono-alpha-beta-unsaturated ketone with a polythiol.

In a specific embodiment the present invention relates to a method of stabilizing an organic material subject to oxidative deterioration which comprises adding thereto an inhibitor prepared by condensing a mono-alpha-beta-unsaturated ketone with an ankanedithiol.

In a more specific embodiment the present invention relates to a method of stabilizing edible fats and oils against rancidity which comprises adding thereto from about 0.001% to about 0.5% by weight of 5,8-dithiadodecanedione-2,11.

In another specific embodiment the present invention relates to a method of stabilizing edible fats and oils against rancidity which comprises adding thereto from about 0.001% to about 0.5% by weight of 1,3,8,10-tetraphenyl-4,7-dithiadecanedione-1,10.

The inhibitors of the present invention are prepared by reacting a mono-alpha-beta-unsaturated ketone with a polythiol. Suitable mono-alpha-beta-unsaturated ketones include vinyl methyl ketone, vinyl ethyl ketone, vinyl propyl ketone, vinyl butyl ketone, vinyl phenyl ketone, vinyl tolyl ketone, etc., mesityl oxide, benzalacetone, benzalacetophenone, dypnone, cyclohexenone-2, cyclohexylidenecyclohexanone, cyclohexylidenetetralone, etc.

Of the polythiol compounds, alkane dithiols are preferred, including ethane dithiol, propane dithiol, butane dithiol, pentane dithiol, etc. Other polythiols include trithiolglycerol, butanetrithiol-1,2,3, butanetetrathiol-1,2,3,4, etc. Suitable aromatic polythiols include dithiohydroquinone, dithio-(alkyl hydroquinone), including the mono-, di-, tri- and tetraalkyl substituted compounds, trithiohydroxyhydroquinone, its alkyl-substituted compounds, and trithiophloroglucinol and its alkyl-substituted compounds, etc.

The reaction of the mono-alpha, beta-unsaturated ketone with the polythiol compound is readily effected, preferably in the presence of a catalyst. Suitable basic catalysts include piperidine, sodium methylate, quaternary ammonium hydroxides, etc. Suitable acid catalysts include anhydrous hydrogen chloride, anhydrous hydrogen bromide, anhydrous hydrogen fluoride, etc.

The inhibitors of the present invention may be further illustrated by the following general formula:

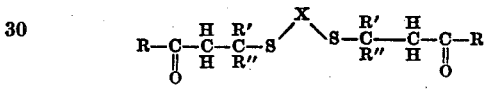

where R, R' and R" are selected from the group consisting of hydrogen alkyl, alkenyl, aryl, alkaryl, aralkyl, cycloalkyl and heterocyclic ring radicals, and where X is a hydrocarbon group to which the sulfur atoms are attached on different carbon atoms. It is understood that R, R', R", and X may in turn be substituted by radicals such as hydroxyl, amino, mono- or dialkylamino, etc. In another embodiment of the invention R and R' may comprise carbon atoms forming a polymethylene ring.

It is understood that an extensive number of compounds may be prepared and used within the broad scope of the present invention but that, while all of these compounds will have some potency in stabilizing organic materials, they are not necessarily of equivalent activity.

It is essential in all these inhibitors that the sulfur atom be attached to a carbon atom beta to the keto group as it has been found that compounds in which the sulfur atom is attached to a carbon atom alpha to the keto group are not good inhibitors. The sulfur atom should be divalent. Further, it is generally preferred that the total number of carbon atoms in the inhibitor is not greater than about 25, as it has been found that, within certain limits, the potency of the inhibitor decreases with inclusion of hydrocarbon radicals of high molecular weight.

The inhibitor of the present invention is generally added to the organic material in amounts of less than 1% by weight. When used in edible fats and oils the inhibitor will generally be employed in amounts of from about 0.001% to about 0.5% by weight, and when used in gasoline the inhibitor will generally be used in amounts above about 0.02% by weight. The inhibitor may be used alone or in conjunction with synergists, inhibitor activators, dyes, antiknock agents, etc., depending upon the material to be stabilized. For example, when used in edible fats and oils a synergist, such as phosphoric acid or ascorbic acid, will generally be used along with the inhibitor. When used in gasoline, lead tetraethyl, a dye and perhaps an inhibitor activator, such as certain types of alkylene polyamines, may be used.

The following examples are introduced to illustrate further the novelty and utility of the present invention, but not with the intention of unduly limiting the same.

The inhibitors of the present invention were tested in lard, and the stability period of the lard was determined by the "Swift" test. This test is described in detail in the article by A. E. King, H. L. Roschen and W. H. Irwin, which appeared in the "Oil and Soap," vol. X, No. 6, pages 106–109 (1933). In general this test comprises bubbling air through a sample of the lard until rancidity is determined organoleptically and by peroxide values.

*Example I*

5,8-dithiadodecanedione-2,11 was prepared as follows: Vinyl methyl ketone and ethane dithiol were cooled to 5° C. and piperidine was added to the mixture. The temperature rose rapidly. After short heating on a steam bath the product was cooled, whereupon it solidified. The solid was dissolved in an ether solvent, washed with dilute sulfuric acid to remove piperidine, and the solvent was evaporated, leaving white crystals—melting point 42–43° C.

The inhibitor prepared in the above manner was added in 0.02 weight per cent concentration to a lard having a normal stability period of 4½ hours. Upon the addition of the inhibitor, the number of hours until the lard developed a peroxide value of 20 was increased from 4½ hours to 63 hours.

*Example II*

1,3,8,10 - tetraphenyl - 4,7 - dithiadecanedione-1,10 was prepared as follows: Benzalacetophenone and ethane dithiol were mixed and a trace of piperidine added. The temperature rose rapidly to about 90° C. and the product solidified. It was recrystallized from toluene—melting point 173–174° C.

The lard used in this example had a normal stability period of 9 hours. Upon the addition of 0.02% by weight of the inhibitor prepared in the above manner, the number of hours to develop a peroxide value of 20 was increased from 9 hours to 39 hours.

We claim as our invention:

1. A method of stabilizing an organic material subject to oxidative deterioration which comprises adding thereto an inhibitor of the following general formula

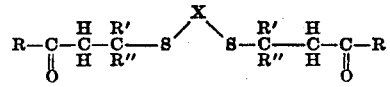

in which R, R' and R'' are selected from the group consisting of hydrogen, alkyl, alkenyl, aryl, alkaryl, aralkyl, cycloalkyl and heterocyclic ring radicals, and in which X is a hydrocarbon group in which the sulfur atoms are attached to different carbon atoms.

2. The method of claim 1 further characterized in that said organic material comprises edible fats and oils.

3. The method of claim 1 further characterized in that said organic material comprises motor fuel.

4. The method of claim 1 further characterized in that said organic material comprises lubricating oil.

5. A method of stabilizing edible fats and oils against rancidity which comprises adding thereto from about 0.001% to about 0.5% by weight of a polythiaalkanepolyone.

6. A method of stabilizing edible fats and oils against rancidity which comprises adding thereto from about 0.001% to about 0.5% by weight of 5,8-dithiadodecanedione-2,11.

7. A method of stabilizing edible fats and oils against rancidity which comprises adding thereto from about 0.001% to about 0.5% by weight of 1,3,8,10 - tetraphenyl - 4,7 - dithiadecanedione-1,10.

8. Edible fats and oils tending to become rancid containing from about 0.001% to about 0.5% by weight of 5,8-dithiadodecanedione-2,11.

9. Edible fats and oils tending to become rancid containing from about 0.001% to about 0.5% by weight of 1,3,8,10-tetraphenyl-4,7 - dithiadecanedione-1,10.

10. An organic material subject to oxidative deterioration containing as an inhibitor for said deterioration a compound of the general formula

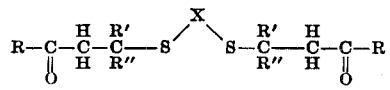

in which R, R' and R'' are selected from the group consisting of hydrogen, alkyl, alkenyl, aryl, alkaryl, aralkyl, cycloalkyl and heterocyclic ring radicals, and in which X is a hydrocarbon group in which the sulfur atoms are attached to different carbon atoms.

11. The composition of claim 10 further characterized in that said organic material is an edible fat or oil.

12. The composition of claim 10 further characterized in that said organic material comprises cracked gasoline.

JOSEPH A. CHENICEK.
RALPH B. THOMPSON.

REFERENCES CITED

The following references are of record in the file of this patent:

UNITED STATES PATENTS

| Number | Name | Date |
|---|---|---|
| 2,320,287 | Lieber et al. | May 25, 1943 |
| 2,396,156 | Clarkson | Mar. 5, 1946 |